B. A. PETERSON.
KNOTTER.
APPLICATION FILED OCT. 5, 1906.
959,592.
Patented May 31, 1910.
3 SHEETS—SHEET 1.
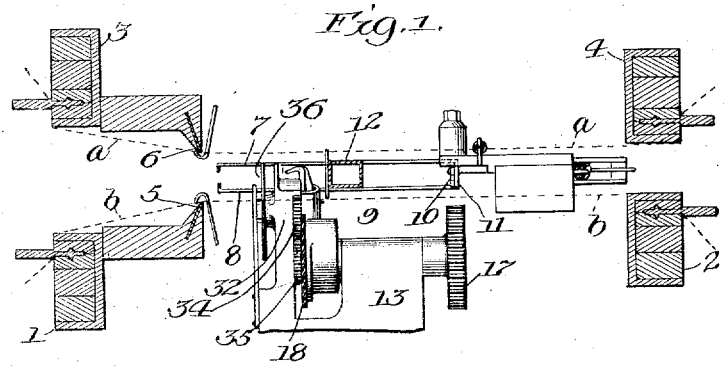
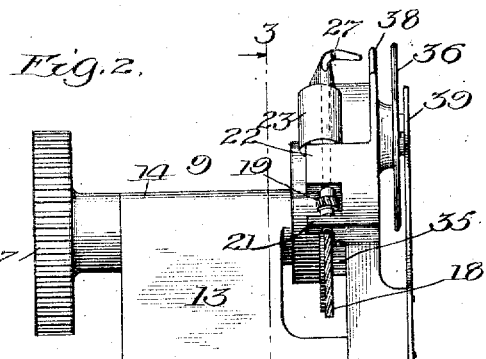
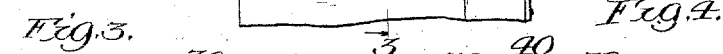
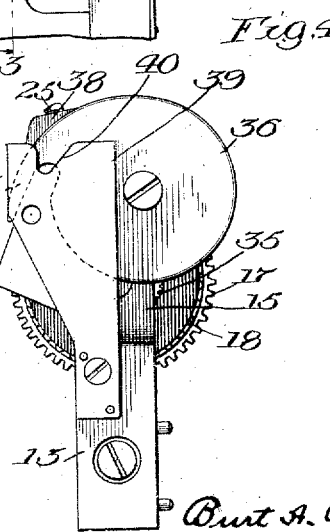
Witnesses:
Inventor.
Burt A. Peterson
By Luther L. Miller, Atty.

B. A. PETERSON.
KNOTTER.
APPLICATION FILED OCT. 5, 1906.
959,592.
Patented May 31, 1910.
3 SHEETS—SHEET 2.
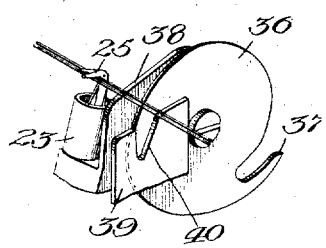
Fig.5.
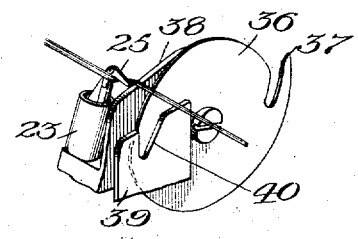
Fig.6.
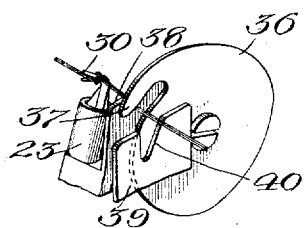
Fig.7.
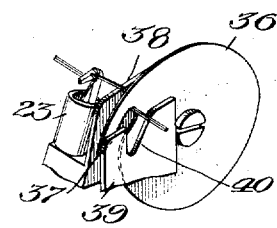
Fig.8.
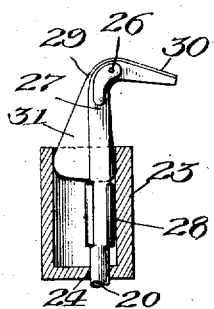
Fig.11.
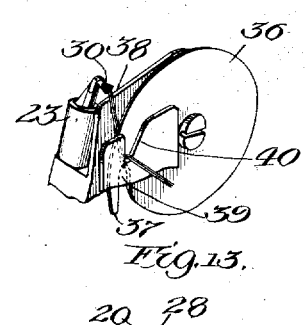
Fig.9.
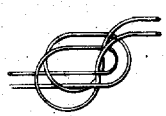
Fig.10.
Fig.13.
Fig.12.
Witnesses.
O. M. Vennich
George L Chindahl
Inventor.
Burt A. Peterson
By Luther L. Miller
Atty.

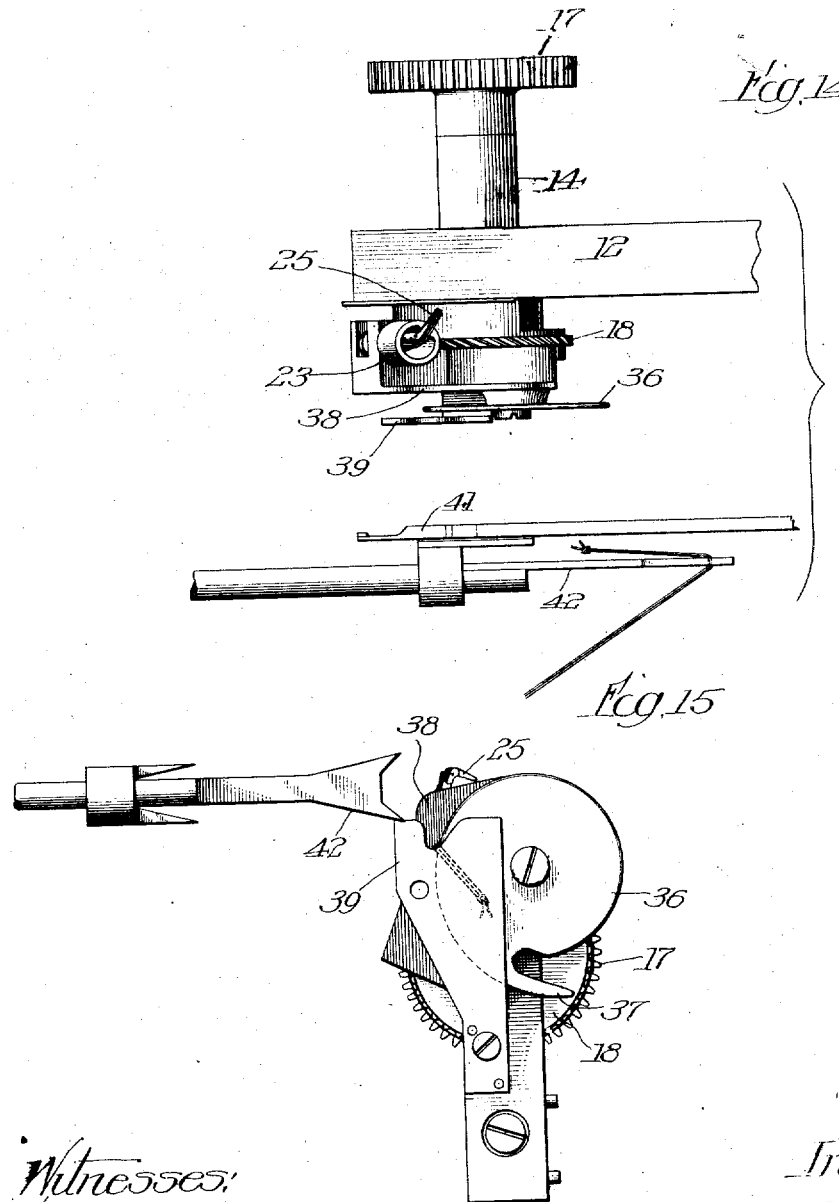

BEST AVAILABLE COPY

UNITED STATES PATENT OFFICE.

BURT A. PETERSON, OF ROCKFORD, ILLINOIS, ASSIGNOR, BY MESNE ASSIGNMENTS, TO HOWARD D. COLMAN, LUTHER L. MILLER, AND HARRY A. SEVERSON, COPARTNERS, OF ROCKFORD, ILLINOIS.

KNOTTER.

959,592.  Specification of Letters Patent.  Patented May 31, 1910.

Application filed October 5, 1906. Serial No. 337,648.

*To all whom it may concern:*

Be it known that I, BURT A. PETERSON, a citizen of the United States, residing at Rockford, in the county of Winnebago and State of Illinois, have invented certain new and useful Improvements in Knotters, of which the following is a specification.

This invention relates to a means for forming knots, and its object is to simplify the means for tightening the knot and removing it from the knot-forming device.

I have herein shown my invention as forming a part of a machine for uniting the ends of two warps, but it will be understood that the invention is not limited to such use, and that it may be employed in any device for joining together two threads by tying.

In the accompanying drawings Figure 1 is a fragmental transverse vertical section through a warp-tying machine provided with a knotter embodying my invention. Fig. 2 is a front elevation of said knotter. Fig. 3 is a sectional view taken on the plane of dotted line 3 3 of Fig. 2. Fig. 4 is a side view of the knotter looking from the right of Fig. 2. Figs. 5, 6, 7, 8 and 9 are views, in a series, illustrating the operation of tying a knot as performed by this knotter. Fig. 10 is a diagrammatic view of the knot formed. Fig. 11 is a side view of the tying bill, showing in longitudinal central section the cam-barrel that actuates the movable shearing and clamping jaw of said bill. Fig. 12 is an upper end view of said cam barrel. Fig. 13 is a transverse section through the knotter shaft, illustrating the sleeve for securing the removable bill spring in place. Fig. 14 is a top plan view showing the relative positions of the knot-tying mechanism and a means for drawing the knotted threads clear of said mechanism. Fig. 15 is a side elevation of said devices.

I have herein illustrated my invention as comprised in a warp-tying machine of the general form shown in British Patent No. 10,484 of 1904, to Howard D. Colman, to which patent reference may be had for a full understanding of the relation of the knotter to the other mechanisms of the machine. The machine may be briefly described as comprising a bed having thereon two stationary thread clamps, and a warp carriage located above said bed, said carriage also being provided with a pair of thread clamps. The clamps upon the bed are for holding one of the warps to be operated upon, and the clamps on the carriage are intended for the other warp. Upon the bed is mounted a carriage (hereinafter called the main carriage) arranged to travel transversely of the warp threads, and from one side of the warps to the other, said main carriage supporting a knotter, mechanism for selecting warp threads in pairs, one from each warp, and mechanism for bringing each selected pair of threads into operative relation with said knotter.

In Fig. 1 the reference numerals 1 and 2 indicate stationary thread clamps upon the bed (not shown) of the warp-tying machine. 3 and 4 are thread clamps carried by the warp carriage. 5 and 6 are metallic ribbons or blades having serrated edges over which the warp threads extend, said ribbons being carried by the bed and the warp carriage, respectively. The warps are indicated in Fig. 1 by the reference letters $a$ and $b$. Upon the bed of the machine, between the clamps 1 and 2, is mounted a main carriage (not herein shown) supporting the devices (also not shown) for selecting threads from the warps $a$ and $b$; reciprocatory separator blades 7 and 8 for separating the selected threads from adjacent or following threads, said blades having forks (not shown) between them for causing said threads to be moved toward each other as said blades and forks advance the threads to the knotter 9; a reciprocatory shear blade 10 adapted to coact with a relatively stationary shear blade 11 for severing the selected threads to provide loose ends for the knot-forming operation; a suction air-tube 12 for holding the severed ends of the threads; a thread guide 41; and a reciprocatory fork 42 for removing the united warp threads from the knotter.

The knotter 9 comprises a knotter frame 13 rigidly mounted upon the main carriage. Said knotter frame comprises bearings 14 and 15 in which is rotatably mounted a shaft 16. Upon one end of said shaft is fixed a spur-gear wheel 17 by means of which power is communicated from a suitable source to said shaft for continuously rotating the latter. A spiral gear 18 rigidly mounted upon the shaft 16 is arranged to mesh with a pinion 19 fixed upon a knotter shaft 20, said shaft being rotatably supported in bearings 21 and 22 in the knotter frame 13. A cam-barrel 23 is rigidly mounted in the knotter frame, said barrel being open at its upper end and having a bearing opening 24 in its lower end through which the knotter shaft 20 extends. As shown in Figs. 2, 11, and 12, the bearing opening 24 is eccentric with relation to said cam-barrel, and said barrel has an interior cam conformation substantially of heart-shape in cross-section. Within the cam-barrel and toward its upper end the knotter shaft 20 is flattened, and at its upper end said shaft is bent in a plane with its flattened surface at an angle somewhat greater than a right angle to form the tying bill 25. At its bend and upon its flattened side the knotter shaft 20 is provided with a pivot pin 26 for a shearing and clamping jaw to be hereinafter described, said jaw lying between the knotter shaft 20 and a bill spring 27 secured in place by means of a sleeve 28 (Figs. 11 and 12) fixed upon said knotter shaft. The point of the bill spring 27 is bent to correspond with the shape of the tying bill 25, and said bill spring is perforated to receive the outer end of the pivot pin 26. A shearing and clamping jaw 29, pivotally mounted upon the pin 26, has a point 30 corresponding in form with the tying-bill 25 and a cam-wing 31 lying within the cam-barrel 23. When the shaft 20 is rotated the shearing and clamping jaw 29 is moved upon its pivot 26 by reason of the cam conformation and the eccentricity of the cam-barrel 23. The edge of the shearing and clamping jaw adjacent to the bill spring 27 is sharpened to form a thread shear with said bill spring, while the other side of the point of said jaw forms a thread clamp with the flattened side of the tying bill 25.

In the bracket 32 of the knotter frame 13 is rotatably mounted a shaft 33 bearing at one end a gear wheel 34 adapted to mesh with a gear wheel 35 fixed upon the shaft 16 adjacent to the spiral gear wheel 18. On the other end of the shaft 33 is fixed a stripper disk 36 having a hook 37 upon its periphery. In the present embodiment the gearing for rotating the tying bill 25 and the stripper disk 36 is so proportioned as to cause two revolutions of the tying bill to one of the stripper disk. A blade 38, in this instance formed integral with the bracket 32, is located between the tying bill 25 and the stripper disk 36. At the outer side of the stripper disk 36 is a guide 39 having a notch 40 therein, said guide being rigidly secured to the knotter frame 13. The upper edge of the blade 38, the peripheral edges of the disk 36, and the upper edges of the guide 39 are rounded at both sides to prevent wear or breakage of the threads extending thereover.

In the operation of the warp-tying machine, two threads, one from each of the warps $a$ and $b$, are selected, separated from adjacent or adhering threads, and severed by the shear blades 10 and 11. The free ends thus formed of the threads are drawn into the suction air-tube 12 and said threads brought close together and substantially parallel, and advanced to a position within the circle described by the point of the tying bill 25 in its rotation, as shown in Fig. 5. In the initial position of the tying mechanism the tying bill 25 extends forwardly from the knotter shaft 20, while the hook 37 of the stripper disk 36 is at the point in its path substantially farthest from said bill. The first three-fourths of a revolution of the tying bill 25 winds the threads about the knotter shaft 20. At this time the shearing and clamping jaw 29 is opened by reason of the eccentricity of the cam-barrel 23, grasps the two threads, and shears and clamps them. The waste ends of the threads are drawn into the suction air-tube 12 and removed. The stripper disk 36 meanwhile has been rotated into position for the hook 37 to engage the threads, and, as an additional one-third revolution of the tying bill occurs, said stripper disk draws the threads downward between the blade 38 and the notched guide 39, tightening the knot and stripping it from the tying bill. At this point the reciprocatory fork 42 is actuated to draw the threads away from said stripper disk and said guide. The completion of the second revolution of the tying bill 25 finds it in the initial position ready to engage another pair of threads, which in the meantime has been placed in operative position. In case the thread-selecting devices fail to select a thread from each warp, the separator blades 7 and 8 and the fork 42 will (by mechanism not herein shown) be arrested before they have completed their full forward movement, therefore the fork 42 will not advance far enough to remove the last previous knot from the knot-tying mechanism. As the stripper disk 36 continues its rotation after pulling said knot from the tying bill, said disk wipes the knotted end of the threads downward into the space between said disk and the guide 39, as indicated in dotted line in Fig. 15. The knotted thread ends will remain in this position until the fork 42 makes a full forward movement and pulls said thread ends into the position shown in Fig. 14. It will therefore be seen that should the fork 42 be arrested and consequently fail to draw the knotted ends clear of the knot-tying mechanism immediately after the knot is completed, said ends will be well within the orbit of the hook 37 and in no danger of being caught and broken by said hook 37.

I claim as my invention:

1. In a knot-tying mechanism, in combination, a tying-bill; means for continuously rotating said tying-bill; a rotatably supported member adapted to engage the knotted threads and strip them from said tying-bill; and means for rotating said member once for every two revolutions of said tying-bill.

2. The combination, with means for supporting two threads at two points in their lengths, of means located between said supporting means for forming a knot; and a rotatory member, also located between said supporting means, and adapted to remove the knotted threads from said knot-forming means.

3. In a knot-tying mechanism, in combination, a rotatory tying-bill adapted to clamp and shear the threads, a rotatory hook adapted to engage the strands extending from the knot and remove the knot and the strands from the tying-bill and tighten the knot, and means across which the strands are pulled by said hook in tightening and removing the knot.

4. In a knot-tying mechanism, in combination, means for forming a knot and shearing the ends of the knotted strands; a hook adapted to engage the strands extending from the knot and remove the knot and the strands from said knot-forming means and tighten the knot; means across which the strands are pulled by said hook in tightening and removing the knot; and means for continuously actuating said knot-forming means and rotating said hook.

5. In a knot-tying mechanism, in combination, a tying-bill, a thread guide, and means located between said bill and said guide for stripping the knot from said bill and wiping the knotted ends into the space between said stripping means and said guide.

6. In a knot-tying mechanism, in combination, means for forming a knot, a thread guide, and a continuously rotated disk between said knot-forming means and said guide; said disk having a stripper hook thereon, and serving to hold the stripped knotted ends out of position for reëngagement by the stripper hook.

7. In a knot-tying mechanism, in combination, a tying bill, a thread guide, and a continuously rotated disk between said bill and said guide, said disk having a stripper hook thereon and being adapted to wipe the knotted ends into the space between said disk and said guide and out of position for reëngagement by said hook.

8. In a knot-tying mechanism, in combination, a tying bill; a rotary stripper hook; a thread guide between said tying bill and said hook; a thread guide at the opposite side of said hook; and means for actuating said tying bill and said hook.

9. In a knot-tying mechanism, in combination, a tying bill; a rotary disk having a stripper hook thereon; a thread guide between said tying bill and said disk, a thread guide at the opposite side of said disk; and means for rotating said tying bill and said stripper disk.

10. In a knot-tying mechanism, in combination, a tying bill, a rotary disk having a stripper hook upon its periphery; a thread guide blade between said tying bill and said disk; a notched thread guide at the opposite side of said disk; and means for rotating said tying bill and said disk.

11. In a knot-tying mechanism, in combination, a supporting structure; a shaft supported in said structure and provided with a tying bill; a shaft supported in said structure; a gear wheel on the last mentioned shaft; a pinion on the tying-bill shaft meshing with said gear wheel; a rotary disk supported by said structure and geared to the second mentioned shaft; a stripper member on said disk; and guide means for the threads.

BURT A. PETERSON.

Witnesses:
HARRY A. SEVERSON,
LOUISE A. CULVER.

---

Corrections in Letters Patent No. 959,592.

It is hereby certified that in Letters Patent No. 959,592, granted May 31, 1910, upon the application of Burt A. Peterson, of Rockford, Illinois, for an improvement in "Knotters," errors appear in the grant and in the heading of the printed specification requiring correction as follows: In the grant, strike out lines 9–12 and insert the following statement:

*He having assigned his right, title, and interest in said improvement, by mesne assignments, to Howard D. Colman, Luther L. Miller, and Harry A. Severson, copartners, doing business as Barber-Colman Company, of Rockford, Illinois;*

Strike out the first three lines of the granting clause and insert the following:

*Now, therefore, these Letters Patent are to grant unto the said Howard D. Colman, Luther L. Miller, and Harry A. Severson, copartners, doing business as Barber-Colman Company, of Rockford, Illinois, their heirs or assigns*

In the heading to the printed specification, after the word "copartners" insert the words *doing business as Barber-Colman Company;* and that the said Letters Patent should be read with these corrections therein that the same may conform to the record of the case in the Patent Office.

Signed and sealed this 18th day of March, A. D., 1913.

[SEAL.]

C. C. BILLINGS,
*Acting Commissioner of Patents.* ously rotating said tying-bill; a rotatably supported member adapted to engage the knotted threads and strip them from said tying-bill; and means for rotating said member once for every two revolutions of said tying-bill.

2. The combination, with means for supporting two threads at two points in their lengths, of means located between said supporting means for forming a knot; and a rotatory member, also located between said supporting means, and adapted to remove the knotted threads from said knot-forming means.

3. In a knot-tying mechanism, in combination, a rotatory tying-bill adapted to clamp and shear the threads, a rotatory hook adapted to engage the strands extending from the knot and remove the knot and the strands from the tying-bill and tighten the knot, and means across which the strands are pulled by said hook in tightening and removing the knot.

4. In a knot-tying mechanism, in combination, means for forming a knot and shearing the ends of the knotted strands; a hook adapted to engage the strands extending from the knot and remove the knot and the strands from said knot-forming means and tighten the knot; means across which the strands are pulled by said hook in tightening and removing the knot; and means for continuously actuating said knot-forming means and rotating said hook.

5. In a knot-tying mechanism, in combination, a tying-bill, a thread guide, and means located between said bill and said guide for stripping the knot from said bill and wiping the knotted ends into the space between said stripping means and said guide.

6. In a knot-tying mechanism, in combination, means for forming a knot, a thread guide, and a continuously rotated disk between said knot-forming means and said guide; said disk having a stripper hook thereon, and serving to hold the stripped knotted ends out of position for reëngagement by the stripper hook.

7. In a knot-tying mechanism, in combination, a tying bill, a thread guide, and a continuously rotated disk between said bill and said guide, said disk having a stripper hook thereon and being adapted to wipe the knotted ends into the space between said disk and said guide and out of position for reëngagement by said hook.

8. In a knot-tying mechanism, in combination, a tying bill; a rotary stripper hook; a thread guide between said tying bill and said hook; a thread guide at the opposite side of said hook; and means for actuating said tying bill and said hook.

9. In a knot-tying mechanism, in combination, a tying bill; a rotary disk having a stripper hook thereon; a thread guide between said tying bill and said disk, a thread guide at the opposite side of said disk; and means for rotating said tying bill and said stripper disk.

10. In a knot-tying mechanism, in combination, a tying bill, a rotary disk having a stripper hook upon its periphery; a thread guide blade between said tying bill and said disk; a notched thread guide at the opposite side of said disk; and means for rotating said tying bill and said disk.

11. In a knot-tying mechanism, in combination, a supporting structure; a shaft supported in said structure and provided with a tying bill; a shaft supported in said structure; a gear wheel on the last mentioned shaft; a pinion on the tying-bill shaft meshing with said gear wheel; a rotary disk supported by said structure and geared to the second mentioned shaft; a stripper member on said disk; and guide means for the threads.

BURT A. PETERSON.

Witnesses:
HARRY A. SEVERSON,
LOUISE A. CULVER.

---

Corrections in Letters Patent No. 959,592.

It is hereby certified that in Letters Patent No. 959,592, granted May 31, 1910, upon the application of Burt A. Peterson, of Rockford, Illinois, for an improvement in "Knotters," errors appear in the grant and in the heading of the printed specification requiring correction as follows: In the grant, strike out lines 9-12 and insert the following statement:

*He having assigned his right, title, and interest in said improvement, by mesne assignments, to Howard D. Colman, Luther L. Miller, and Harry A. Severson, copartners, doing business as Barber-Colman Company, of Rockford, Illinois;*

Strike out the first three lines of the granting clause and insert the following:

*Now, therefore, these Letters Patent are to grant unto the said Howard D. Colman, Luther L. Miller, and Harry A. Severson, copartners, doing business as Barber-Colman Company, of Rockford, Illinois, their heirs or assigns*

In the heading to the printed specification, after the word "copartners" insert the words *doing business as Barber-Colman Company;* and that the said Letters Patent should be read with these corrections therein that the same may conform to the record of the case in the Patent Office.

Signed and sealed this 18th day of March, A. D., 1913.

[SEAL.]

C. C. BILLINGS,
*Acting Commissioner of Patents.*

It is hereby certified that in Letters Patent No. 959,592, granted May 31, 1910, upon the application of Burt A. Peterson, of Rockford, Illinois, for an improvement in "Knotters," errors appear in the grant and in the heading of the printed specification requiring correction as follows: In the grant, strike out lines 9–12 and insert the following statement:

*He having assigned his right, title, and interest in said improvement, by mesne assignments, to Howard D. Colman, Luther L. Miller, and Harry A. Severson, copartners, doing business as Barber-Colman Company, of Rockford, Illinois,*

Strike out the first three lines of the granting clause and insert the following:

*Now, therefore, these Letters Patent are to grant unto the said Howard D. Colman, Luther L. Miller, and Harry A. Severson, copartners, doing business as Barber-Colman Company, of Rockford, Illinois, their heirs or assigns.*

In the heading to the printed specification, after the word "copartners" insert the words *doing business as Barber-Colman Company;* and that the said Letters Patent should be read with these corrections therein that the same may conform to the record of the case in the Patent Office.

Signed and sealed this 18th day of March, A. D., 1913.

[SEAL.]

C. C. BILLINGS,
*Acting Commissioner of Patents.*